US012485522B2

(12) United States Patent
Braun

(10) Patent No.: US 12,485,522 B2

(45) Date of Patent: Dec. 2, 2025

(54) HAND-HELD POWER TOOL COMPRISING A STRIKING MECHANISM AND A DAMPING ELEMENT

(71) Applicant: Robert Bosch GmbH, Stuttgart (DE)

(72) Inventor: Willy Braun, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/694,121

(22) PCT Filed: Aug. 5, 2022

(86) PCT No.: PCT/EP2022/072114

§ 371 (c)(1), (2) Date: Mar. 21, 2024

(87) PCT Pub. No.: WO2023/057114

PCT Pub. Date: Apr. 13, 2023

(65) Prior Publication Data

US 2024/0383118 A1 Nov. 21, 2024

(30) Foreign Application Priority Data

Oct. 4, 2021 (DE) ..................... 10 2021 211 161.0

(51) Int. Cl.
*B25D 17/08* (2006.01)

(52) U.S. Cl.
CPC ........ *B25D 17/082* (2013.01); *B25D 2222/57* (2013.01); *B25D 2250/131* (2013.01); *B25D 2250/371* (2013.01)

(58) Field of Classification Search
CPC .............. B25D 17/082; B25D 2222/57; B25D 2250/131; B25D 2250/371
See application file for complete search history.

(56) References Cited

U.S. PATENT DOCUMENTS 2,958,534 A * 11/1960 Fuehrer ................ B25D 17/082 279/19.1
7,413,026 B2 8/2008 Berghauser et al.
(Continued)

OTHER PUBLICATIONS

International Search Report corresponding to PCT Application No. PCT/EP2022/072114, mailed Jan. 10, 2023 (German and English language document) (6 pages).

*Primary Examiner* — Michelle Lopez
(74) *Attorney, Agent, or Firm* — Maginot, Moore & Beck LLP

(57) ABSTRACT

A hand-held power tool includes a tool receiving area which has an inner receiving area that is designed to receive an insert tool and also includes a striking mechanism for applying striking pulses to the insert tool. A locking bolt is provided in order to lock the insert tool, wherein the locking bolt is connected to an operating element which is designed to position the locking bolt such that the insert tool is locked in a locked position and is unlocked in an unlocked position in order to be removed from the inner receiving area, and the locking bolt is paired with at least one damping element for at least partly damping a force acting on the insert tool in an idle running state of the hand-held power tool. The tool receiving area is paired with a receiving chamber in which the locking bolt and the at least one damping element are arranged. The locking bolt is at least partly received in a receiving area of a force transmission element, and the at least one damping element is arranged directly on the force transmission element in the receiving chamber.

13 Claims, 6 Drawing Sheets

(56) References Cited

U.S. PATENT DOCUMENTS

| | | | | |
|---|---|---|---|---|
| 7,624,815 | B2 | 12/2009 | Friedrich et al. | |
| 2008/0006423 | A1* | 1/2008 | Berghauser .......... | B25D 17/082<br>173/132 |

* cited by examiner

HAND-HELD POWER TOOL COMPRISING A STRIKING MECHANISM AND A DAMPING ELEMENT

This application is a 35 U.S.C. § 371 National Stage Application of PCT/EP2022/072114, filed on Aug. 5, 2022, which claims the benefit of priority to Serial No. DE 10 2021 211 161.0, filed on Oct. 4, 2021 in Germany, the disclosures of which are incorporated herein by reference in their entirety.

BACKGROUND

The present disclosure relates to a hand-held power tool comprising a tool receiving area which has an inner receiving area with a longitudinal extension, said inner receiving area being designed to receive an insert tool and comprising a striking mechanism for applying striking pulses to the insert tool arranged in the inner receiving area. A locking bolt arranged at least approximately perpendicular to the longitudinal extension of the inner receiving area is provided in order to lock the insert tool in the inner locking receiving area, wherein the operating element is designed to position the locking bolt in the inner receiving area in such a way that the insert tool is locked in the inner receiving area in a locked position and unlocked in an unlocked position in order to be removed from the inner receiving area, and the locking bolt is paired with at least one damping element for at least partly damping a force acting on the insert tool in an idle running neutral state of the hand-held power tool.

From the prior art, such a hand-held power tool, designed as a demolition hammer, is known. This hand-held power tool includes a tool receiving area for receiving an insert tool. Furthermore, the hand-held power tool includes a striking mechanism for applying striking pulses on an insert tool arranged in an inner receiving area of the tool receiving area. To lock the insert tool in the inner receiving area, a locking bolt is provided which is arranged at least approximately perpendicular to the longitudinal extension of the inner receiving area, which is connected to an operating element in a rotationally fixed manner. The operating element is designed to position the locking bolt in the inner receiving area such that the insert tool is locked in the inner receiving area in a locked position and unlocked in an unlocked position to be removed from the inner receiving area. The locking bolt is paired with at least one damping element for damping a force acting on the insert tool in an idle running state of the hand-held power tool.

SUMMARY

The disclosure relates to a hand-held power tool comprising a tool receiving area which has an inner receiving area with a longitudinal extension, said inner receiving area being designed to receive an insert tool and comprising a striking mechanism for applying striking pulses on the insert tool arranged in the inner receiving area. A locking bolt arranged at least approximately perpendicular to the longitudinal extension of the inner receiving area is provided in order to lock the insert tool in the inner locking receiving area, wherein the operating element is designed to position the locking bolt in the inner receiving area in such a way that the insert tool is locked in the inner receiving area in a locked position and unlocked in an unlocked position in order to be removed from the inner receiving area, and the locking bolt is paired with at least one damping element for at least partly damping a force acting on the insert tool in an idle running neutral state of the hand-held power tool. The tool receiving area is paired with a receiving chamber in which the locking bolt as well as the at least one damping element are arranged, wherein the locking bolt is at least partly received in a receiving area of a force transmission element, and wherein the at least one damping element is arranged directly on the force transmission element in the receiving area.

The disclosure thus enables the provision of a hand-held power tool in which a secure and reliable arrangement of the at least one damping element can be enabled by the arrangement of the at least one damping element directly on the force transmission element in the receiving chamber.

Preferably, the receiving chamber is designed as a closed internal space.

This makes it easy and straightforward to provide a suitable receiving chamber.

A cover element perpendicular to the longitudinal extension of the inner receiving area is preferably arranged between a side surface of a base body of the tool receiving area and the operating element.

Thus the receiving chamber can be formed in a simple way.

Preferably, the operating element is rotationally connected to the locking bolt via a pin.

In this way, the rotationally fixed connection between the operating element and the locking bolt can be formed securely and reliably, thereby allowing the locking bolt to be arranged in the locked position and the unlocked position.

According to one embodiment, the at least one damping element is arranged between a side wall of the receiving chamber facing the free end of the inner receiving area and the force transmission element.

This makes it easy and straightforward to arrange the damping element in the inner receiving area.

The at least one damping element is preferably rod-shaped or C-shaped.

This makes it easy to provide a suitable damping element.

Preferably, the at least one damping element is an elastomeric element and/or a spiral spring.

This makes it easy and straightforward to provide a suitable damping element.

According to one embodiment, the force transmission element comprises at least one application portion for applying force on the at least one damping element as well as a receiving area for at least partly receiving the locking bolt.

This enables a secure and robust arrangement of the locking bolt in the inner receiving area.

Preferably, the application portion is arranged along the longitudinal extension between the locking bolt and one end of the receiving chamber facing away from a free end of the inner receiving area.

In this way, at least partial damping may be reliably achieved by the damping element acted upon by the application portion.

Preferably, the force transmission element is designed as a stamped part, a sintered part, or a steel part.

This means that a suitable force transmission element may be provided in a simple and cost-efficient manner.

Preferably, the force transmission element is arranged along a longitudinal extension of the locking bolt arranged perpendicular to the longitudinal extension of the inner receiving area, adjacent to the inner receiving area.

This makes it easy and straightforward to suitably arrange the force transmission element to transmit force on the damping element.

According to one embodiment, the operating element is designed as a retaining bracket or rotary knob.

This enables simple and user-friendly locking and/or unlocking of the locking bolt.

BRIEF DESCRIPTION OF THE DRAWINGS

The disclosure is explained in further detail in the following description with reference to exemplary embodiments shown in the drawings. The figures show.

DETAILED DESCRIPTION

Figure 1:
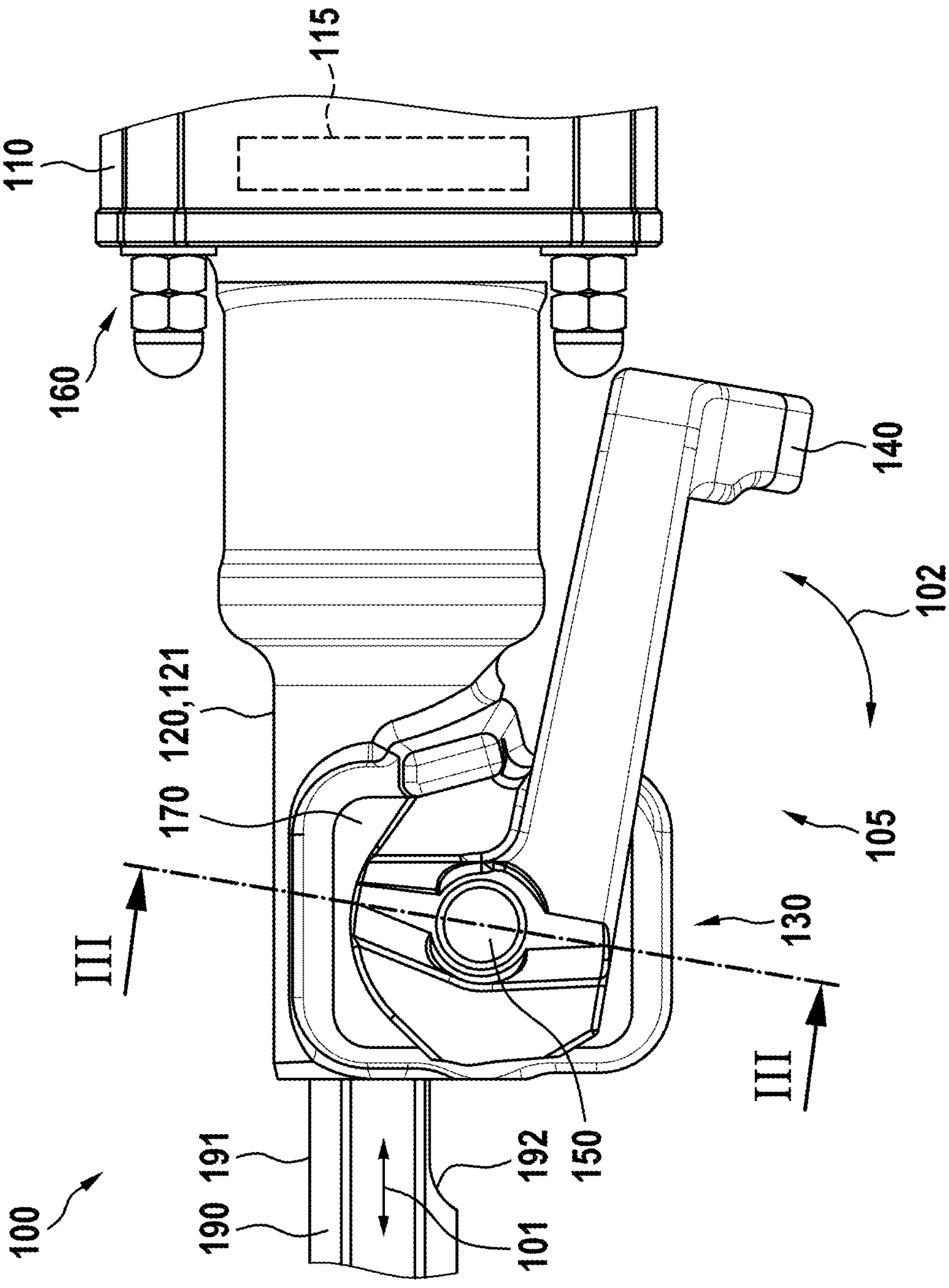
FIG. 1 a side view of a hand-held power tool comprising a tool receiving area and a locking unit, FIG. 2 a longitudinal section through the hand-held power tool shown in FIG. 1, FIG. 3 a section along a cut line III-III of FIG. 1 through the locking unit of FIG. 1 and FIG. 2 to illustrate an arrangement of a damping element paired with the locking unit, FIG. 4 a section along a cut line IV-IV of FIG. 3 through the locking unit of FIG. 1 to FIG. 3, FIG. 5 a cut along the cut line IV-IV of FIG. 3 through the locking unit of FIG. 1 to FIG. 3 with an alternative damping element, and FIG. 6 a cut along cut line IV-IV of FIG. 3 through the locking unit of FIG. 1 to FIG. 3 with a damping element according to another embodiment.

Elements having the same or a comparable function are provided with the same reference characters in the drawings and are described in detail only once.

FIG. 1 shows an illustrative hand-held power tool 100 that is designed in an exemplary manner as a demolition hammer. The hand-held power tool 100 comprises a housing 110 in which at least one power unit (not shown) is arranged to drive a striking mechanism 115. Furthermore, a tool receiving area 120 is provided for receiving an insert tool 190. However, for the sake of simplicity and clarity of the drawing, only an output-side portion of the hand-held power tool 100 is depicted in FIG. 1.

The striking mechanism 115 is preferably designed to apply striking pulses on the insert tool 190 arranged in the tool receiving area 120. Preferably, the insert tool 190 is designed as a chisel. In particular, the insert tool 190 is designed as a hexagonal insert tool 191. Preferably, the insert tool 190 comprises a locking portion 192. The locking portion 192 is preferably designed as a locking groove. Such an insert tool 190 is sufficiently known from the prior art, so that a detailed description of the insert tool 190 is omitted here.

The tool receiving area 120 preferably comprises a tubular base body 121. Preferably, an inner receiving area (202 in FIG. 2) with a longitudinal extension 101 is paired with the base body 121. The inner receiving area (202 in FIG. 2) is designed to receive the insert tool 190. According to one embodiment, the tool receiving area 120 or the base body 121 is releasably attached to the housing 110 via a screw connection 160.

Furthermore, the tool receiving area 120 is paired with a locking unit 130 for locking the insert tool 190 in the tool receiving area 120. For this purpose, a locking bolt 150 is paired with the locking unit 130. Preferably, the locking bolt 150 is arranged at least approximately perpendicular to the longitudinal extension 101. The locking bolt 150 is preferably connected to an operating element 140 in a rotationally fixed manner. The operating element 140 is preferably designed to position the locking bolt 150 in the inner receiving area (202 in FIG. 2) of the tool receiving area 120 such that the insert tool 190 is locked in the inner receiving area (202 in FIG. 2) in a locked position 105 and unlocked in an unlocked position to be removed from the inner receiving area (202 in FIG. 2). For this purpose, the operating element 140 may be rotated in the circumferential direction of the locking bolt 150 or in the direction of an arrow 102. Illustratively, the operating element 140 is designed as a retaining bracket. However, the operating element 140 may alternatively also be designed as a rotary knob.

In addition, a cover element 170 is preferably arranged between the base body 121 of the tool receiving area 120 and the operating element 140. Preferably, the cover element 170 is arranged perpendicular to the longitudinal extension 101 of the inner receiving area (202 in FIG. 2).

It is noted that the present disclosure is not limited to demolition hammers. Thus, the present disclosure may be applied to all hammers, in particular, impact hammers with a locking bolt lock.

Figure 2:
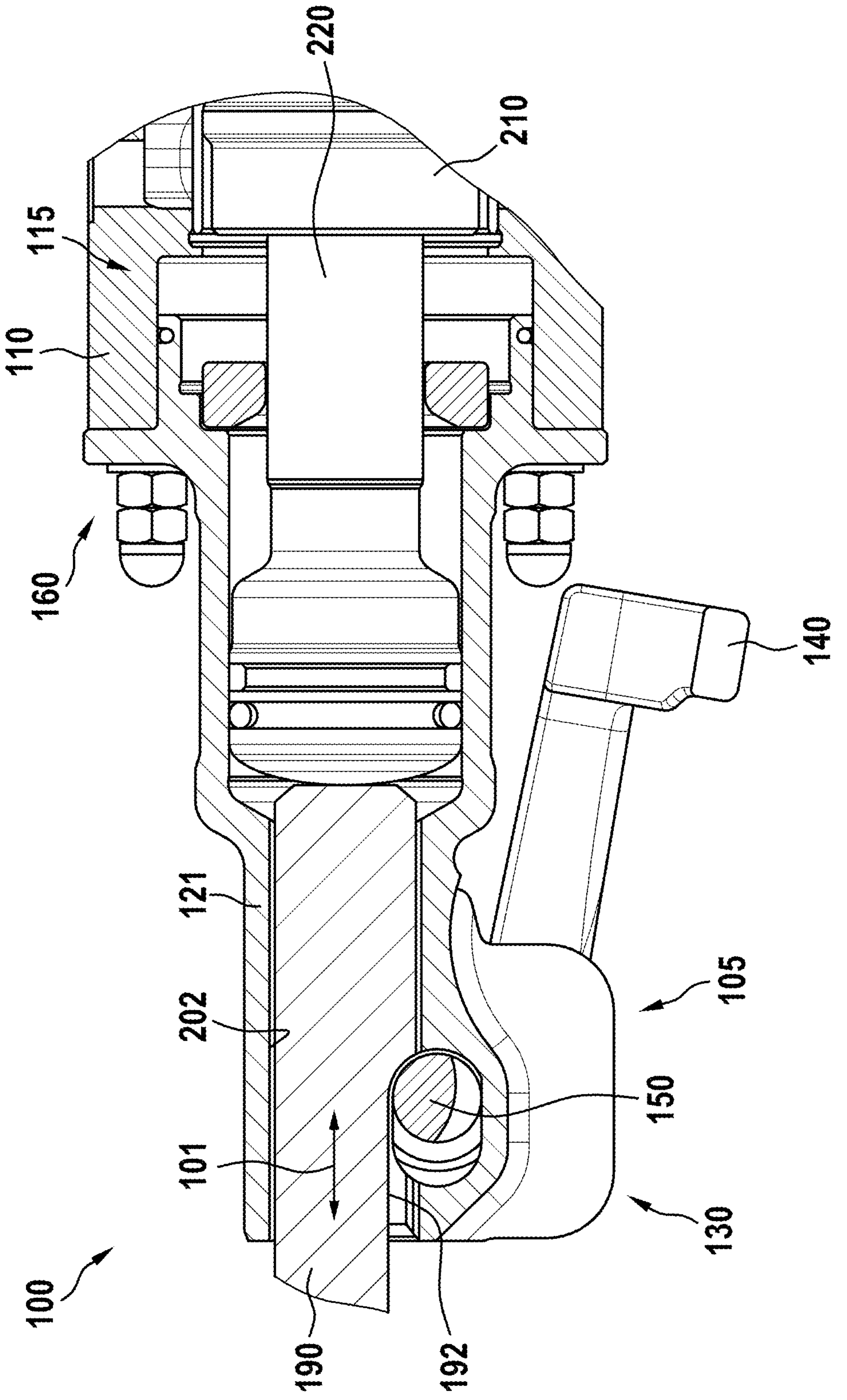

FIG. 2 shows the hand-held power tool 100 shown in FIG. 1 with the housing 110 and the base body 121 of the tool receiving area 120 as well as the locking unit 130 in the locked position 105. FIG. 2 illustrates the insert tool 190 arranged in an inner receiving area 202 of the tool receiving area 120. The locking bolt 150 locks the insert tool 190 in the inner receiving area 202 in the locked position 105 shown in FIG. 2.

Moreover, FIG. 2 shows a beater 210 paired with the striking mechanism 115, as well as a striking pin 220 that can be applied with force by the beater 210. Preferably, the beater 210 is driven by a drive unit (not shown), and the striking pin 220 applies force on the insert tool 190 during operation of the striking mechanism 115. In FIG. 2, the striking mechanism 115 is shown in an idle running state or in a front end point where the locking groove 192 of the insert tool 190 abuts the locking bolt 150. In so doing, the entire striking chain, consisting of the beater 210, the striking pin 220, and the insert tool 190, is gradually decelerated during further forward movement, i.e., an illustrative movement to the left, and is finally prevented from continuing forward movement by the locking bolt 150.

Figure 3:
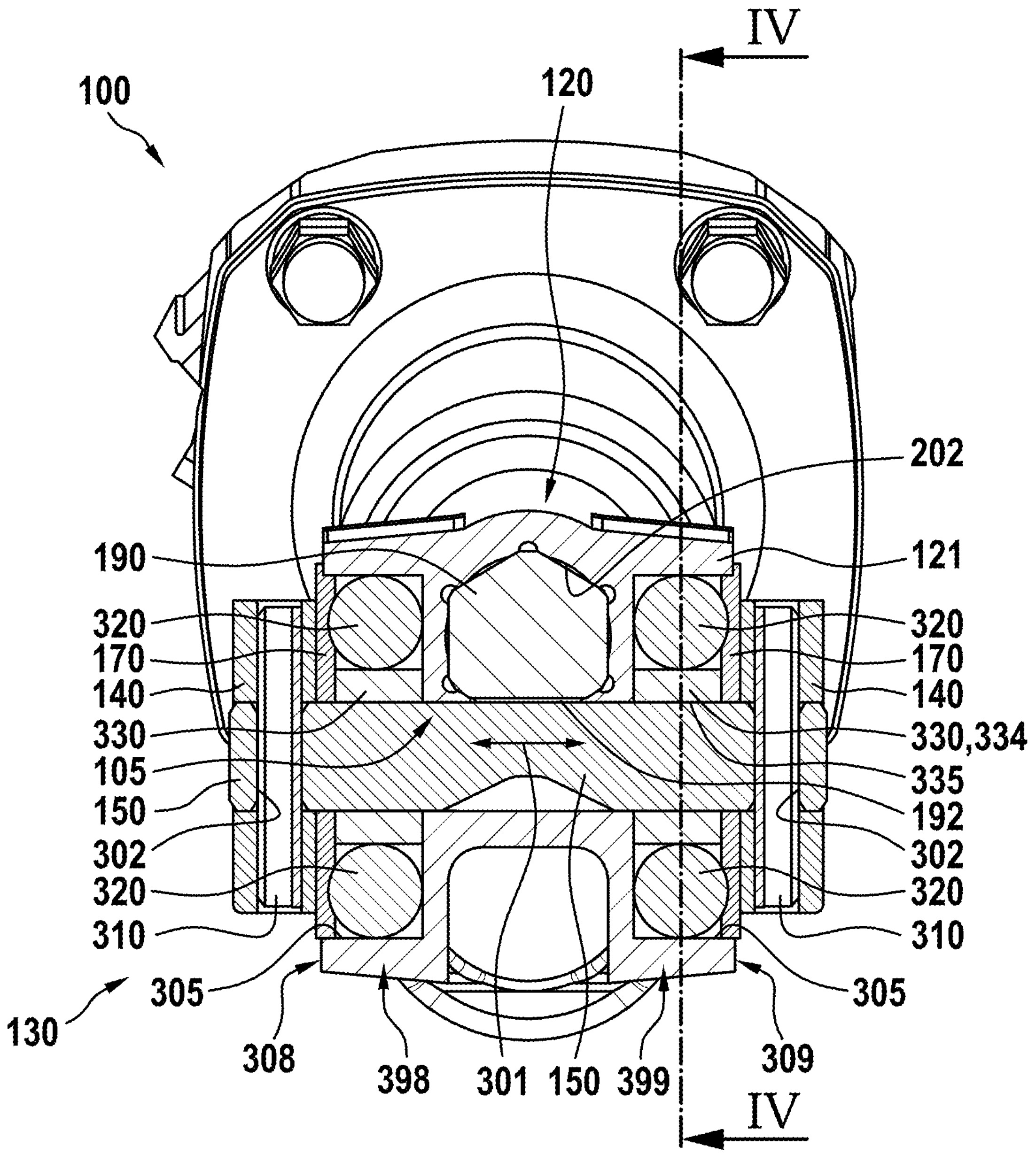

FIG. 3 shows the hand-held power tool 100 of FIG. 1 and FIG. 2 and illustrates the locking unit 130 with the locking bolt 150. The insert tool 190 is illustratively arranged in the inner receiving area 202 of the tool receiving area 120 and locked in the locked position 105 by the locking bolt 150. The locking bolt 150 is arranged in the locking groove 192 of the insert tool 190. The tool receiving area 120 is preferably paired with a receiving chamber in which the locking bolt 150 is arranged. Preferably, the locking bolt 150 is paired with at least one damping system 398, 399. According to one embodiment, the receiving chamber 305 is designed as a closed internal space. It is noted, however, that the receiving chamber 305 can also be open, i.e., without the cover element 170, e.g., as an open internal space.

The at least one damping system 398, 399 is preferably paired with at least one damping element 320 for at least partly damping a force applied on the insert tool 190 in the idle running state of the hand-held power tool 100 or the idle running state described in FIG. 2. According to the disclosure, the at least one damping system 398, 399, in particular the at least one damping element 320, is arranged with the locking bolt 150 in the receiving chamber 305. Furthermore, a force transmission element 330 is preferably paired with the damping system 398, 399. The force transmission element 330 preferably comprises a receiving area 334 with a preferably central receiving area 335. Preferably, the locking bolt 150 is at least partly received in the receiving area 335 of the force transmission element 330. Furthermore, the at least one damping element 320 is arranged directly on the force transmission element 330 in the receiving chamber 305. Here, the at least one damping element 320 is arranged between the force transmission element 330 and the base body 121, where there is no direct contact with the locking bolt 150.

Illustratively, two damping systems 398, 399 are provided, wherein a damping system 398, 399 is arranged laterally in FIG. 3 in the inner receiving area 202 of the tool receiving area 120 or facing a side surface 308, 309 of the base body 121. Similarly, a receiving chamber 305 is illustratively arranged laterally in the inner receiving area 202, or facing a side surface 308, 309, respectively. Preferably, the force transmission element 330, (530, 540 in FIG. 5) is arranged along a longitudinal extension 301 of the locking bolt 150 that is arranged perpendicular to the longitudinal extension 101 of FIG. 1 of the inner receiving area 202 adjacent to the inner receiving area 202. Furthermore, the force transmission element 330 (530, 540 in FIG. 5) is preferably designed as a stamping part, sintering part, or steel part.

A cover element 170 is preferably arranged between the side surfaces 308, 309 of the base body 121 of the tool receiving area 120 and the operating element 140. The cover element 170 is arranged perpendicular to the longitudinal extension 101 of the inner receiving area 202 and/or along the longitudinal extension 301 of the locking bolt 150, as described above. By arranging the cover elements 170 on the base body 121 of the tool receiving area 120, the receiving area 305 designed as a closed inner space is illustratively formed.

Preferably, the operating element 140 is rotationally connected to the locking bolt 150 via a pin 310. Illustratively, the operating element 140 is connected to the locking bolt 150 on both side surfaces 308, 309 via a pin 310. To receive the pin 310, the operating element 140 preferably comprises a receiving area 302. It is noted that the operating element 140 may also be connected to the locking bolt 150 only at one side surface 308, 309.

The at least one damping element 320 (520 in FIG. 5; 620, 630, 640 in FIG. 6) is preferably rod-shaped or C-shaped. Preferably, the at least one damping element 320 (520 in FIG. 5; 620, 630, 640 in FIG. 6) is designed to be elastically deformable. Preferably, the at least one damping element 320 (520 in FIG. 5; 620, 630, 640 in FIG. 6) is an elastomeric element and/or a spiral spring. Preferably, the core task of the damping systems 398, 399 is the gentle energy reduction of the striking chain going into the idle running state. On the one hand, this is achieved by the spring forces opposing the compensating movement not acting in a pulse-like manner, but gradually increasing. On the other hand, however, it is also advantageous if as much energy as possible is gently dissipated during this braking movement. Due to their internal material friction, damping elements designed as elastomeric elements may dissipate more motion energy.

Figure 4:
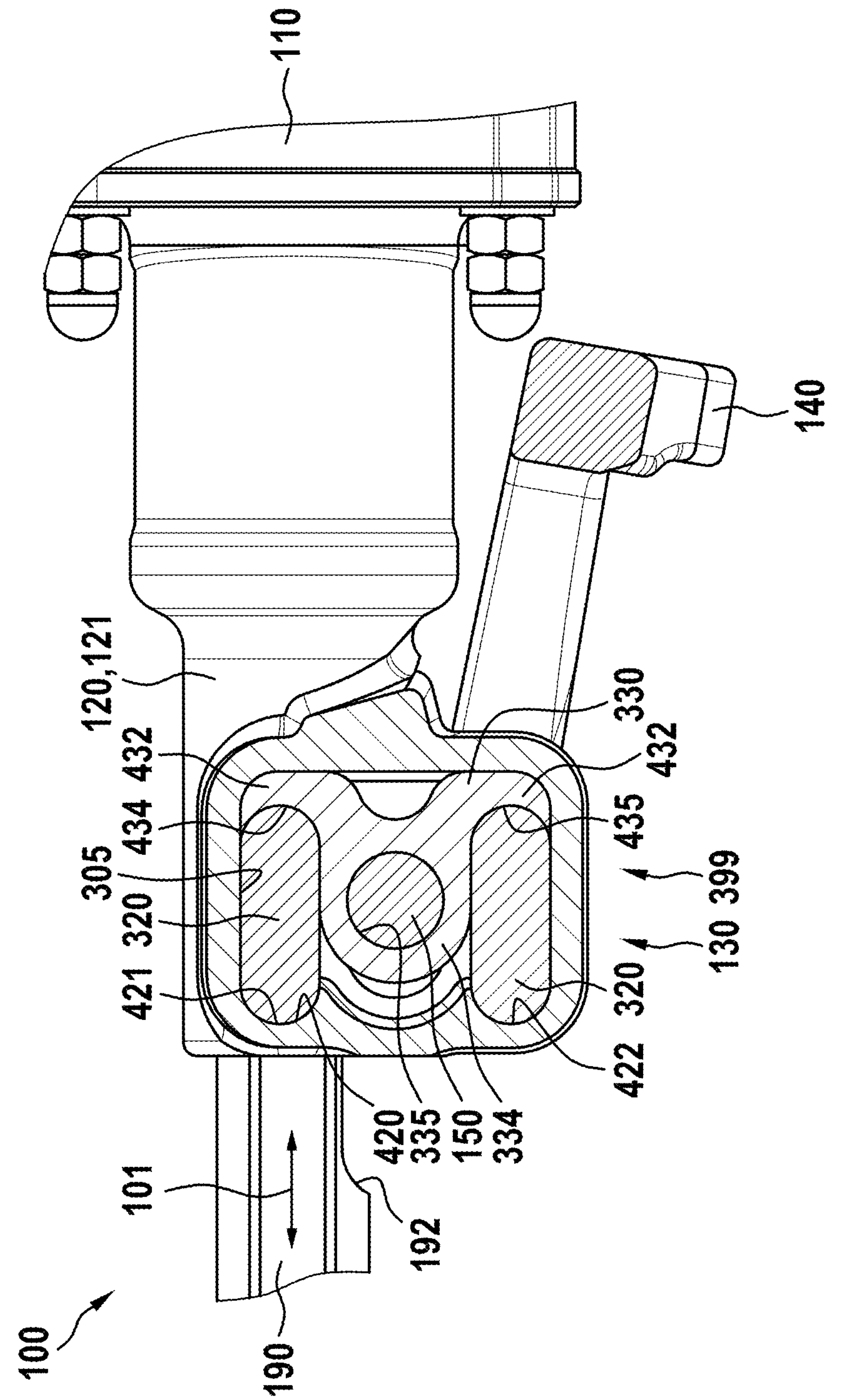

FIG. 4 shows the hand-held power tool 100 shown in FIG. 1 to FIG. 3 and illustrates a set-up of preferably two damping systems 398, 399 using the damping system 399. The at least one damping element 320 (520 in FIG. 5; 620, 630, 640 in FIG. 6) is arranged between a sidewall 420 of the receiving chamber 305 or the inner space facing the free end of the inner receiving area 202 of FIG. 2 and FIG. 3 and the force transmission element 330 (530, 540 in FIG. 5). Furthermore, the force transmission element 330 (530, 540 in FIG. 5) comprises at least one application portion 432 (531, 532, 541, 542 in FIG. 5) for applying force on at least one damping element 320 (520 in FIG. 5; 630, 640 in FIG. 6), as well as the receiving area 335 (533, 543 in FIG. 5) for at least partly receiving the locking bolt 150. Illustratively, the force transmission element 330 (530, 540 in FIG. 5) is formed at least approximately omega (Ω)-shaped. Illustratively, the application portion 432 (531, 532, 541, 542 in FIG. 5) is arranged along the longitudinal extension 101 between the locking bolt 150 and an end of the receiving chamber 305 facing away from a free end of the inner receiving area 202, i.e., the application portion 432 (531, 532, 541, 542 in FIG. 5) is illustratively arranged to the right of the locking bolt 150 in FIG. 4. In addition, the application portion 432 (531, 532, 541, 542 in FIG. 5) is arranged parallel to the locking bolt 150, illustratively above and/or below the locking bolt 150.

Illustratively, two rod-shaped damping elements 320 are shown in FIG. 4. Here, the illustrative upper damping element 320 is arranged between a receiving area 421 of the sidewall 420 and a receiving area 434 of the application portion 432 facing the side wall 420. Analogously, the illustrative lower damping element 320 is arranged between a receiving area 422 of the sidewall 420 and a receiving area 435 of the application portion 432 facing the side wall 420. According to one embodiment, the damping elements 320 are formed as elastomeric elements.

Preferably, the locking bolt 150 is designed as a limit stop of the insert tool 190 and the striking chain or the beater 210 and the striking bolt 220 shown in FIG. 2. A damping movement of the damping system 399 or 398 shown in FIG. 3 occurs in the receiving chamber 305 along the longitudinal extension 101 of the inner receiving area 202 shown in FIG. 2. Preferably, the damping system 399 or 398 shown in FIG. 3 slowly and continuously reduces a comparatively high striking pulse load, such that wear in the hand-held power tool 100 can be reduced and the service life of the hand-held power tool 100 can be improved.

Figure 5:
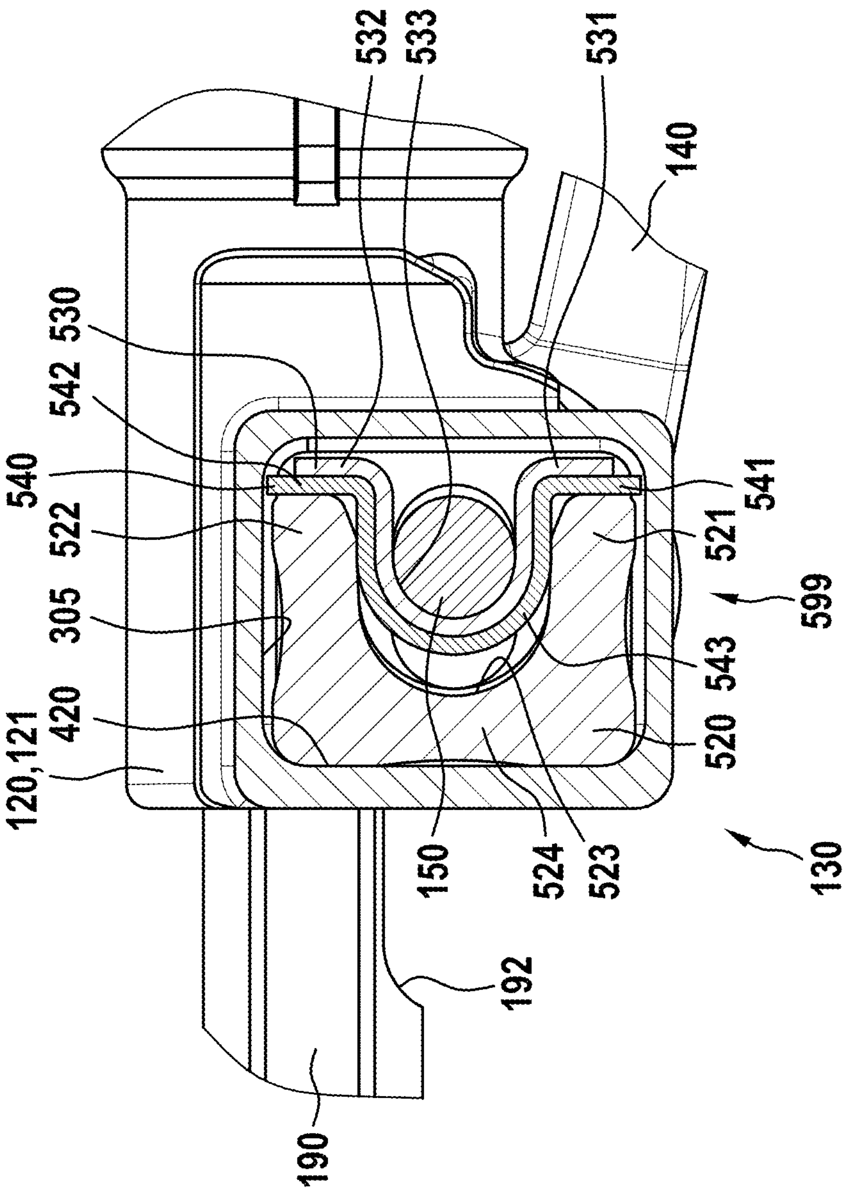

FIG. 5 shows the hand-held power tool 100 shown in FIG. 1 to FIG. 3 and illustrates an alternative damping system 599, which may preferably replace the two damping systems 398, 399 shown in FIG. 3. Preferably, the damping system 599 comprises two at least approximately omega (Ω)-shaped force transmission elements 530, 540 and one at least approximately C-shaped illustrative damping element 520. According to the embodiment shown, the two force transmission elements 530, 540 each have a central arc-shaped receiving area 533, 543 as well as two application portions 531, 532, 541, 542. The arc-shaped receiving area 533 of the force transmission element 530 is illustratively in direct contact with the locking bolt 150. The force transmission element 540 is in direct contact with the side of the force transmission element 530 facing the side wall 420.

The at least approximately C-shaped damping element 520 has an illustratively upper area 522 that can be applied with force and an illustratively lower region 521 that can be applied with force. Preferably, the two areas 521, 522 that can be applied with force are connected to each other via a connection portion 524. The connection portion 524 has an arc-shaped inner receiving area 523 on its side facing the force transmission elements 530, 540. The application portions 541, 542 of the force transmission element 540 are preferably in direct contact with the areas 521, 522 of the damping element 520 to be applied with force. In particular, the C-shaped damping element 520 is preferably integrally formed.

According to the embodiment shown, the damping element 520 is designed as an elastomeric element. In this case, the damping element 520 can be designed such that a multi-stage stiffness curve can be achieved. By way of example, the illustrative long and thinner areas 521, 522 to be applied with force are first compressed during the braking movement of the insert tool 190, corresponding to a softer spring characteristic. In the last third of the braking movement, the short and thicker connection area 524 then preferably still engages, so that the stiffness increases and both the insert tool 190 and the tool receiving area 120 can be protected from a hard metallic impact.

The optimized design of the damping system 599 allows it to act as a virtually active brake. For example, the damping system 599 shown in FIG. 5 is shaped such that during the braking movement of the force transmission elements 530, 540 towards the illustrative left, the area 521, 522 that can be applied with force adjacent to the force transmission element 540 is predominately compressed radially outward. The damping element 520 is increasingly pressed against the outer walls of the tool receiving area 120 at its braking zones, so that an increasing normal force and also a friction force is created due to the displacement, which creates an active braking effect.

Figure 6:
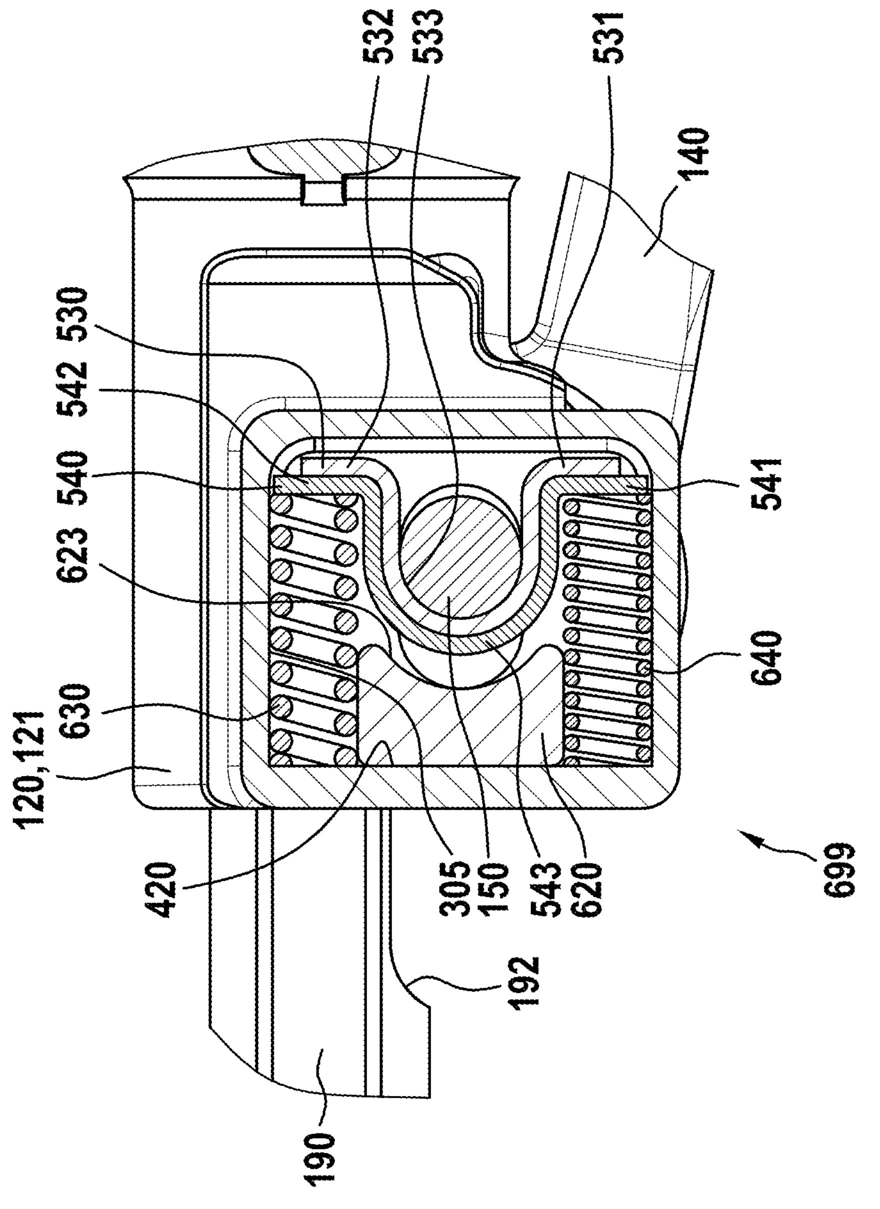

FIG. 6 shows the hand-held power tool 100 shown in FIG. 1 to FIG. 3 and illustrates an alternative damping system 699, which may preferably replace the two damping systems 398, 399 shown in FIG. 3. The damping system 699 illustratively has three damping elements 620, 630, 640, as well as the force transmission elements 530, 540 of FIG. 5. The illustrative upper and lower damping elements 630, 640 are designed as spiral springs. According to one embodiment, the two damping elements 630, 640 designed as spiral springs have different spring rates. The damping element 620 is formed as an elastomeric element and is arranged illustratively between the two damping elements 630, 640 designed as spiral springs. Thus, the braking force can also be generated by one or more spiral springs, which do not necessarily have to be identical, in combination with elastomeric springs. To generate a particular device-specific spring/damper characteristic, the damping elements 320, 520, 620, 630, 640 may also be designed differently. Both progressive and degressive spring characteristics are therefore conceivable. Analogous to the connection area 524 shown in FIG. 5, the damping element 620 preferably has an arc-shaped inner receiving area 623 on its side facing the force transmission elements 530, 540.

The invention claimed is:

1. A hand-held power tool, comprising:

a tool receiving area structure which defines an inner receiving area with a longitudinal extension, said inner receiving area being designed to receive an insert tool; and a striking mechanism configured to apply striking pulses to the insert tool;

a locking bolt arranged at least approximately perpendicular to the longitudinal extension of the inner receiving area and configured to lock the insert tool in the inner receiving area;

an operating element to which the locking bolt is connected, said operating element being designed to position the locking bolt in the inner receiving area such that the insert tool is locked in a locked position in the inner receiving area and is unlocked in an unlocked position in order to be removed from the inner receiving area;

at least one damping element, the locking bolt being paired with the at least one damping element for at least partly damping a force acting on the insert tool in an idle running state of the hand-held power tool; and a force transmission element, wherein the tool receiving area structure defines a receiving chamber in which the locking bolt, the at least one damping element, and the force transmission element are arranged, wherein the locking bolt is at least partly received in a receiving area of the force transmission element, and wherein, in a direction of the longitudinal extension, the at least one damping element is arranged directly on the force transmission element in the receiving chamber.

2. The hand-held power tool of claim 1, wherein the receiving chamber is formed as a closed internal space.

3. The hand-held power tool of claim 1, wherein the operating element is connected to the locking bolt in a rotationally fixed manner via a pin.

4. The hand-held power tool of claim 1, wherein the at least one damping element is arranged between a side wall of the receiving chamber oriented toward an open end of the inner receiving area and the force transmission element.

5. The hand-held power tool of claim 1, wherein the at least one damping element is rod-shaped or C-shaped.

6. The hand-held power tool of claim 1, wherein the at least one damping element is an elastomeric element and/or a spiral spring.

7. The hand-held power tool of claim 1, wherein the force transmission element comprises at least one application portion configured to apply a force on the at least one damping element as well as a receiving area configured to at least partly receive the locking bolt.

8. The hand-held power tool of claim 7, wherein the application portion is arranged along the longitudinal extension between the locking bolt and an end of the receiving chamber facing away from an open end of the inner receiving area.

9. The hand-held power tool according to claim 1, wherein the force transmission element is designed as a punching part, sintering part, or a steel part.

10. The hand-held power tool of claim 1, wherein the operating element is designed as a retaining bracket or rotary knob.

11. The hand-held power tool of claim 1, wherein, in a direction perpendicular to the longitudinal extension, the force transmission element is interposed at least partially between the at least one damping element and the locking bolt.

12. A hand-held power tool, comprising a tool receiving area structure which has an inner receiving area with a longitudinal extension, said inner receiving area being designed to receive an insert tool; and a striking mechanism configured to apply striking pulses to the insert tool;

a locking bolt arranged at least approximately perpendicular to the longitudinal extension of the inner receiving area and configured to lock the insert tool in the inner receiving area;

an operating element to which the locking bolt is connected, said operating element being designed to position the locking bolt in the inner receiving area such that the insert tool is locked in a locked position in the inner receiving area and is unlocked in an unlocked position in order to be removed from the inner receiving area;

at least one damping element, the locking bolt being paired with the at least one damping element for at least partly damping a force acting on the insert tool in an idle running state of the hand-held power tool;

a force transmission element; and a cover element, wherein:

the tool receiving area structure is paired with a receiving chamber in which the locking bolt and the at least one damping element are arranged, the locking bolt is at least partly received in a receiving area of the force transmission element, the at least one damping element is arranged directly on the force transmission element in the receiving chamber, and the cover element is arranged (i) perpendicular to the longitudinal extension of the inner receiving area, and (ii) between a side surface of a base body of the tool receiving area structure and the operating element.

13. A hand-held power tool, comprising:

a tool receiving area structure which has an inner receiving area with a longitudinal extension, said inner receiving area being designed to receive an insert tool; and a striking mechanism configured to apply striking pulses to the insert tool;

a locking bolt arranged at least approximately perpendicular to the longitudinal extension of the inner receiving area and configured to lock the insert tool in the inner receiving area;

an operating element to which the locking bolt is connected, said operating element being designed to position the locking bolt in the inner receiving area such that the insert tool is locked in a locked position in the inner receiving area and is unlocked in an unlocked position in order to be removed from the inner receiving area;

at least one damping element, the locking bolt being paired with the at least one damping element for at least partly damping a force acting on the insert tool in an idle running state of the hand-held power tool; and a force transmission element;

wherein the tool receiving area structure is paired with a receiving chamber in which the locking bolt and the at least one damping element are arranged, wherein the locking bolt is at least partly received in a receiving area of the force transmission element, wherein the at least one damping element is arranged directly on the force transmission element in the receiving chamber, and wherein the force transmission element is arranged adjacent to the inner receiving area along a longitudinal extension of the locking bolt that is arranged perpendicular to the longitudinal extension of the inner receiving area.

* * * * *